US012795099B2

(12) United States Patent
Zweig

(10) Patent No.: US 12,795,099 B2
(45) Date of Patent: Nov. 10, 2026

(54) SYSTEMS AND METHODS FOR PROCESSING VIDEO

(71) Applicant: Canva Pty Ltd, Surry Hills (AU)

(72) Inventor: Alon Zweig, Sydney (AU)

(73) Assignee: Canva Pty Ltd, Surry Hills (AU)

( * ) Notice: Subject to any disclaimer, the term of this patent is extended or adjusted under 35 U.S.C. 154(b) by 14 days.

(21) Appl. No.: 19/176,634

(22) Filed: Apr. 11, 2025

(65) Prior Publication Data

US 2026/0323030 A1 Oct. 15, 2026

(51) Int. Cl.

| | |
|---|---|
| ***H04N 19/12*** | (2014.01) |
| ***G11B 27/10*** | (2006.01) |
| ***G11B 27/34*** | (2006.01) |
| ***H04N 19/127*** | (2014.01) |
| ***H04N 19/172*** | (2014.01) |
| ***H04N 19/40*** | (2014.01) |
| *H04N 19/17* | (2014.01) |

(52) U.S. Cl.
CPC ......... *H04N 19/127* (2014.11); *G11B 27/102* (2013.01); *G11B 27/34* (2013.01); *H04N 19/172* (2014.11); *H04N 19/40* (2014.11)

(58) Field of Classification Search
USPC .......................................................... 386/241
See application file for complete search history.

(56) References Cited

U.S. PATENT DOCUMENTS 6,480,537 B1 * 11/2002 Agrawal .............. H04N 21/435 375/E7.277
10,412,391 B1 * 9/2019 Balannik .............. H04N 19/142
11,334,622 B1 5/2022 Buckley et al.
11,887,275 B1 * 1/2024 Baker, III ............... B63B 15/02
12,368,907 B1 * 7/2025 Fishman ........ H04N 21/234345
12,608,939 B2 4/2026 Vishwakarma et al.
2002/0191959 A1 * 12/2002 Lin ...................... H04N 19/177 375/E7.22
2007/0127572 A1 * 6/2007 Sasai .................... H04N 19/137 375/E7.254
2008/0122921 A1 * 5/2008 Ren ........................ H04N 19/67 375/E7.181

(Continued)

OTHER PUBLICATIONS

Xiao et al., Can I Trust Your Answer? Visually Grounded Video Question Answering, Mar. 30, 2024, available at https://arxiv.org/pdf/2309.01327 (last visited Apr. 11, 2025), pp. 1-15.

(Continued)

*Primary Examiner* — Nigar Chowdhury
(74) *Attorney, Agent, or Firm* — GrowIP Law Group LLC

(57) ABSTRACT

Described herein is a computer implemented method for generating one or more highlight clips from a video content item. The method includes: receiving a request to generate the one or more highlight clips, the request including the video content item; generating a video script of the video content item, the video script comprising captions for one or more frames of the video content item; identifying one or more highlights in the video content item based on the video script; generating the one or more highlight clips based on the identified one or more highlights; and causing display of the one or more highlight clips in a user interface displayed on a user device.

19 Claims, 2 Drawing Sheets

(56) References Cited

U.S. PATENT DOCUMENTS

| | | | | |
|---|---|---|---|---|
| 2008/0310630 | A1* | 12/2008 | Candelore | H04N 21/44055 380/217 |
| 2011/0228848 | A1* | 9/2011 | Dvir | H04N 19/107 375/E7.076 |
| 2013/0077674 | A1* | 3/2013 | Kim | H04N 19/115 375/240.03 |
| 2013/0100245 | A1* | 4/2013 | Lee | H04N 19/597 382/233 |
| 2013/0251033 | A1* | 9/2013 | Han | H04N 19/23 375/240.08 |
| 2014/0267779 | A1* | 9/2014 | Schmidt | H04N 17/004 348/180 |
| 2014/0362159 | A1* | 12/2014 | Zhai | H04N 7/141 348/14.01 |
| 2015/0312652 | A1 | 10/2015 | Baker et al. | |
| 2016/0164651 | A1* | 6/2016 | Reddappagari | H04L 5/0044 370/252 |
| 2016/0261912 | A1* | 9/2016 | Gratton | H04N 21/440218 |
| 2016/0293160 | A1 | 10/2016 | Nir | |
| 2018/0007286 | A1 | 1/2018 | Li et al. | |
| 2018/0240221 | A1* | 8/2018 | Rijnders | G06T 5/10 |
| 2019/0042874 | A1 | 2/2019 | Possos et al. | |
| 2019/0205652 | A1 | 7/2019 | Ray et al. | |
| 2019/0373040 | A1* | 12/2019 | Grubbs | H04L 65/65 |
| 2021/0168472 | A1* | 6/2021 | Monaco | H04N 21/23406 |
| 2022/0005477 | A1 | 1/2022 | Ma et al. | |
| 2022/0021745 | A1* | 1/2022 | Thai | H04L 67/5651 |
| 2022/0038747 | A1* | 2/2022 | Lee | H04N 19/154 |
| 2022/0076023 | A1 | 3/2022 | Shin et al. | |
| 2022/0108727 | A1 | 4/2022 | van Welzen et al. | |
| 2022/0141456 | A1* | 5/2022 | Galpin | H04N 19/82 375/240.02 |
| 2022/0207805 | A1 | 6/2022 | Anvaripour et al. | |
| 2022/0394249 | A1* | 12/2022 | Ohkawa | H04N 19/117 |
| 2023/0034884 | A1* | 2/2023 | Waine | H04N 19/105 |
| 2023/0055421 | A1 | 2/2023 | Ma et al. | |
| 2024/0163457 | A1* | 5/2024 | Brändli | H04N 19/162 |
| 2024/0233305 | A1* | 7/2024 | Pisarenco | G06T 11/00 |
| 2024/0275996 | A1* | 8/2024 | Debnath | A61B 34/25 |
| 2024/0354918 | A1* | 10/2024 | Weerasinghe | G06T 11/00 |
| 2024/0380949 | A1 | 11/2024 | Yang et al. | |
| 2024/0404559 | A1 | 12/2024 | Zheng et al. | |
| 2025/0024048 | A1* | 1/2025 | Zhang | G06V 20/70 |
| 2025/0140005 | A1 | 5/2025 | Eyal | |
| 2025/0142182 | A1 | 5/2025 | Materzynska et al. | |
| 2025/0209794 | A1 | 6/2025 | Seybold et al. | |
| 2025/0247586 | A1 | 7/2025 | Chen et al. | |
| 2025/0280140 | A1* | 9/2025 | Shin | H04N 19/44 |
| 2025/0316102 | A1* | 10/2025 | Sureka | G06T 5/60 |
| 2025/0386064 | A1* | 12/2025 | Lal | H04N 21/2355 |
| 2026/0038171 | A1* | 2/2026 | Kim | G06T 11/60 |
| 2026/0073576 | A1* | 3/2026 | Zhang | G06T 11/00 |

OTHER PUBLICATIONS

Yang et al. Vid2Seq: Large-Scale Pretraining of a Visual Language Model for Dense Video Captioning, Mar. 21, 2023, available at https://arxiv.org/pdf/2302.14115 (last visited Apr. 11, 2025), pp. 1-18.

* cited by examiner

SYSTEMS AND METHODS FOR PROCESSING VIDEO

TECHNICAL FIELD

Aspects of the present disclosure are generally related to video and more particularly to systems and methods for processing video.

BACKGROUND

Various computer applications for processing and editing multimedia content items, such as video clips exist. Generally speaking, such applications allow users to create and/or edit existing video content items.

Processing video frames that form a video involves a computational or time cost. For example, the decoding of video frames involves a cost. There is also further cost associated with processing decoded video frames.

SUMMARY

Described herein are computer-implemented methods for determining a set of frames from encoded video content. The method provides a way to identify a subset of frames from encoded video content, which can then be used for various processing tasks, such as generating navigable content, like video highlights or chapters. For example, the subset of frames may be passed to a trained machine learning model for further processing. In comparison to methods that involve decoding all or substantially all frames of an encoded video, the disclosed methods reduce the number of frames that require decoding in order to determine a useful set of frames. Some of the disclosed methods avoid decoding any frames in order to determine a useful set of frames, by making determinations based on the encoded frames.

A computer-implemented method includes: determining a first set of frames, wherein the first set of frames includes a plurality of encoded frames of encoded video content determined, as part of the determining of the first set of frames, to be large encoded frames and does not include a plurality of encoded frames of the encoded video content determined, as part of the determining of the first set of frames, not to be large encoded frames; decoding the first set of frames to generate a first set of decoded frames; determining, based on a similarity metric between decoded frames, similar frames in the first set of decoded frames, wherein the similar frames are neighbouring or adjacent decoded frames in the first set of decoded frames; determining a second set of frames based on the determined first set of frames and the determined similar frames, wherein the second set of frames omits at least one frame of the first set of frames based on the determined similar frames; and storing, outputting or using the determined second set of frames or data identifying the determined second set of frames.

A computer-implemented method includes: determining a first set of frames, wherein the first set of frames includes a plurality of encoded frames of encoded video content determined, as part of the determining of the first set of frames, to be large encoded frames and does not include a plurality of encoded frames of the encoded video content determined, as part of the determining of the first set of frames, not to be large encoded frames; and storing, outputting or using the determined second set of frames or data identifying the determined first set of frames.

A computer-implemented method includes: determining, based on a similarity metric between decoded frames of a first set of decoded frames, similar frames in the first set of decoded frames, wherein the similar frames are neighbouring or adjacent decoded frames in the first set of decoded frames; determining a second set of frames based on the determined first set of frames and the determined similar frames, wherein the second set of frames omits at least one frame of the first set of frames based on the determined similar frames; and storing, outputting or using the determined second set of frames or data identifying the determined second set of frames.

A computer-implemented method comprises: receiving encoded video content comprising interdependent frames; determining a first set of frames from the encoded video content, the first set of frames including a subset of the interdependent frames selected based on frame size; decoding the first set of frames to generate a first set of decoded frames; comparing the decoded frames in the first set to identify similar neighbouring or adjacent frames; determining a second set of frames by removing at least one frame from the first set based on the identified similar frames; and providing the determined second set of frames or data identifying the second set of frames for further processing or storage.

A computer-implemented method comprises: for encoded video content identifying a set of large encoded frames; decoding the identified large encoded frames to form a set of decoded frames; identifying a set of semantically dissimilar frames in the set of decoded frames; and storing, outputting or using the set of semantically dissimilar frames or data identifying the set of semantically dissimilar frames or providing the set of semantically dissimilar frames or data identifying the set of semantically dissimilar frames for further processing.

It will be understood from the entirety of this disclosure, including the accompanying figures, that the computer-implemented methods described in the immediately preceding paragraphs may be implemented across a range of embodiments. Example features of embodiments are described in the paragraphs below. Other features will be apparent from the disclosure.

In some embodiments the storing, outputting or using the determined second set of frames or data identifying the determined second set of frames, or providing the second set of frames for further processing or storage, or providing the set of semantically dissimilar frames or data identifying the set of semantically dissimilar frames for further processing comprises one or more of a) storing the frames as a temporally-ordered subset of frames from the encoded video content, wherein the subset of frames enables processing of the encoded video content without decoding all frames of the encoded video content, thereby reducing computational resources required for video processing, b) generating a video script comprising the frames and associated time information, wherein the video script has a frame rate that is less than 20% of a frame rate of the encoded video content, and providing the video script for further processing, or c) providing the frames to a trained machine learning model for processing, wherein processing the determined frames reduces computational resources compared to processing all frames of the encoded video content.

In some embodiments the encoded video content includes interdependent frames formed based on difference encoding.

In some embodiments the encoded video content includes I-frames and at least one of P-frames and B-frames.

In some embodiments the encoded video content is encoded according to a form of MPEG video compression.

In some embodiments determining the first set of frames comprises including all I-frames of the encoded video content in the first set of frames. Determining frames to be large encoded frames may then comprise determining whether P-frames or B-frames are large frames.

In some embodiments the determination of a large encoded frame is made with reference to a normalised size of the encoded frame.

In some embodiments the similarity metric between decoded frames is a measure of distance between a vector embedding of the decoded frames.

In some embodiments the similarity metric between decoded frames is a measure frame semantic similarity.

In some embodiments the encoded video content is first encoded video content and the method further includes creating the first encoded video content by transcoding second encoded video content. The second encoded video content may have irregular I-frame encoding and the transcoding may result in the first encoded video content having regular I-frame encoding. Additionally or alternatively, the second encoded video content may not have directly readable frame size information in meta data and the transcoding may result in the first encoded video content having directly readable frame size information.

In some embodiments the storing, outputting or using the determined second set of frames or data identifying the determined second set of frames comprises providing the determined set of frames to a trained machine learning model. The trained machine learning model may be configured or trained to produce navigable content for the video content. The navigable content may be highlights of the video content. Additionally or alternatively the navigable content may be a set of chapters of the video content.

Also described herein is a computer processing system including: a processing unit; and a non-transitory computer-readable storage medium storing instructions, which when executed by the processing unit, cause the processing unit to perform the method described above.

Further described herein is a non-transitory storage medium storing instructions executable by a processing unit to cause the processing unit to perform the method described above.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form to avoid unnecessary obscuring.

The functionality or features of the present disclosure may be implemented by or in a computer processing system. The computer processing system may be a personal computer, a standalone computer or networked environment such as one implementing a client-server architecture.

Figure 1:
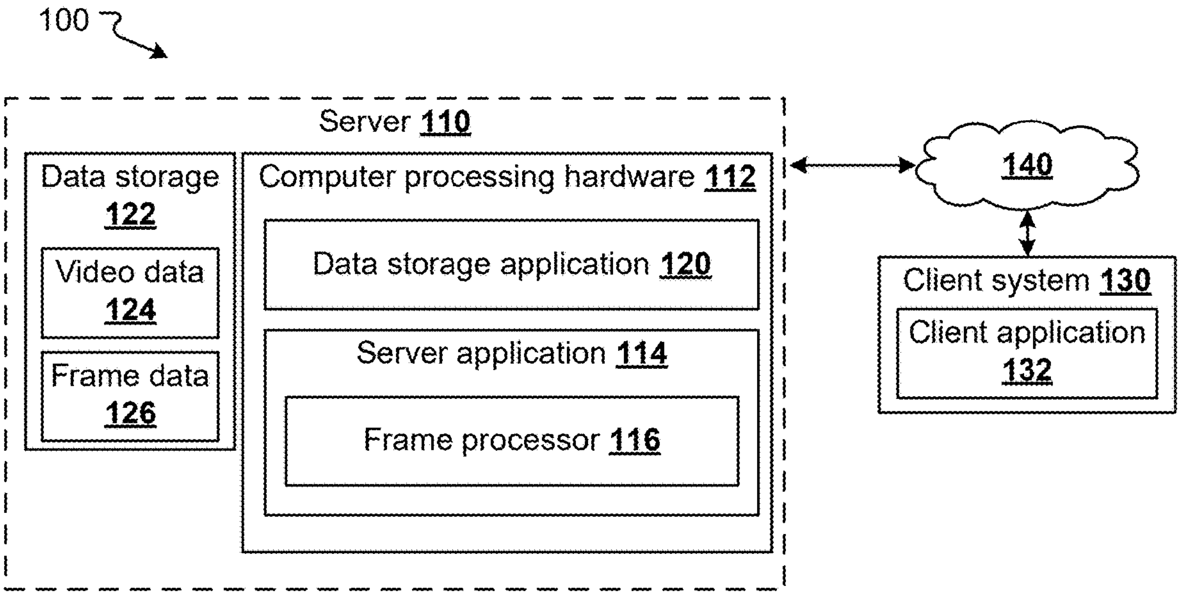
FIG. 1 is a block diagram depicting a networked computing environment.
Figure 2:
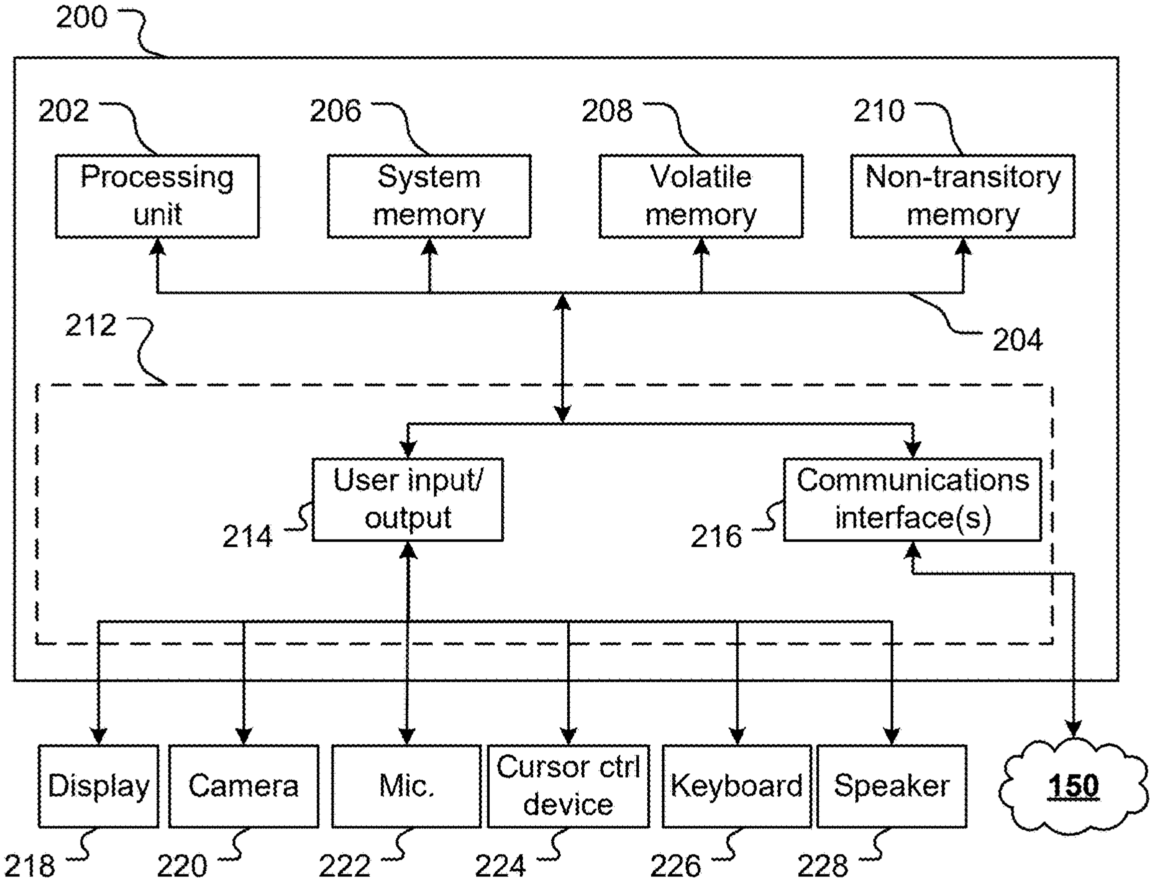
FIG. 2 is a block diagram of a computer processing system.

FIG. 1 is a block diagram depicting an example networked environment 100 in which various features of the present disclosure may be implemented. FIG. 2 is a block diagram depicting an example computer processing system 200 in which various features of the present disclosure may be implemented. The networked environment 100 or the computer processing system 200 may implement some or all of the functionality of a method 300 described herein with reference to FIG. 3. This functionality may be provided by other networked environments or other computer processing systems.

The networked environment 100 includes server- and client-side applications, which operate together to perform the processing described herein. The networked environment 100 includes a server 110 and a client system 130, which communicate via one or more communications networks 140 (e.g., the Internet, another wide area network or a local area network).

The server 110 includes computer processing hardware 112 on which applications execute that provide server-side functionality to client applications such as client application 132. In the present example, the server 110 includes a server application 114 and a data storage application 120. The server application 114 includes computer-readable instructions in non-transitory storage and executes to provide a client application endpoint that is accessible over the communications network 140. For example, where the server application 114 serves web browser client applications, the server application 114 will be hosted by a web server which receives and responds (for example) to HTTP requests. Where the server application 114 serves native client applications, the server application 114 may be hosted by an application server configured to receive, process, and respond to specifically defined API calls received from those client applications. The server 110 may include one or more web server applications and/or one or more application server applications allowing it to interact with both web and native client applications.

Figure 3:
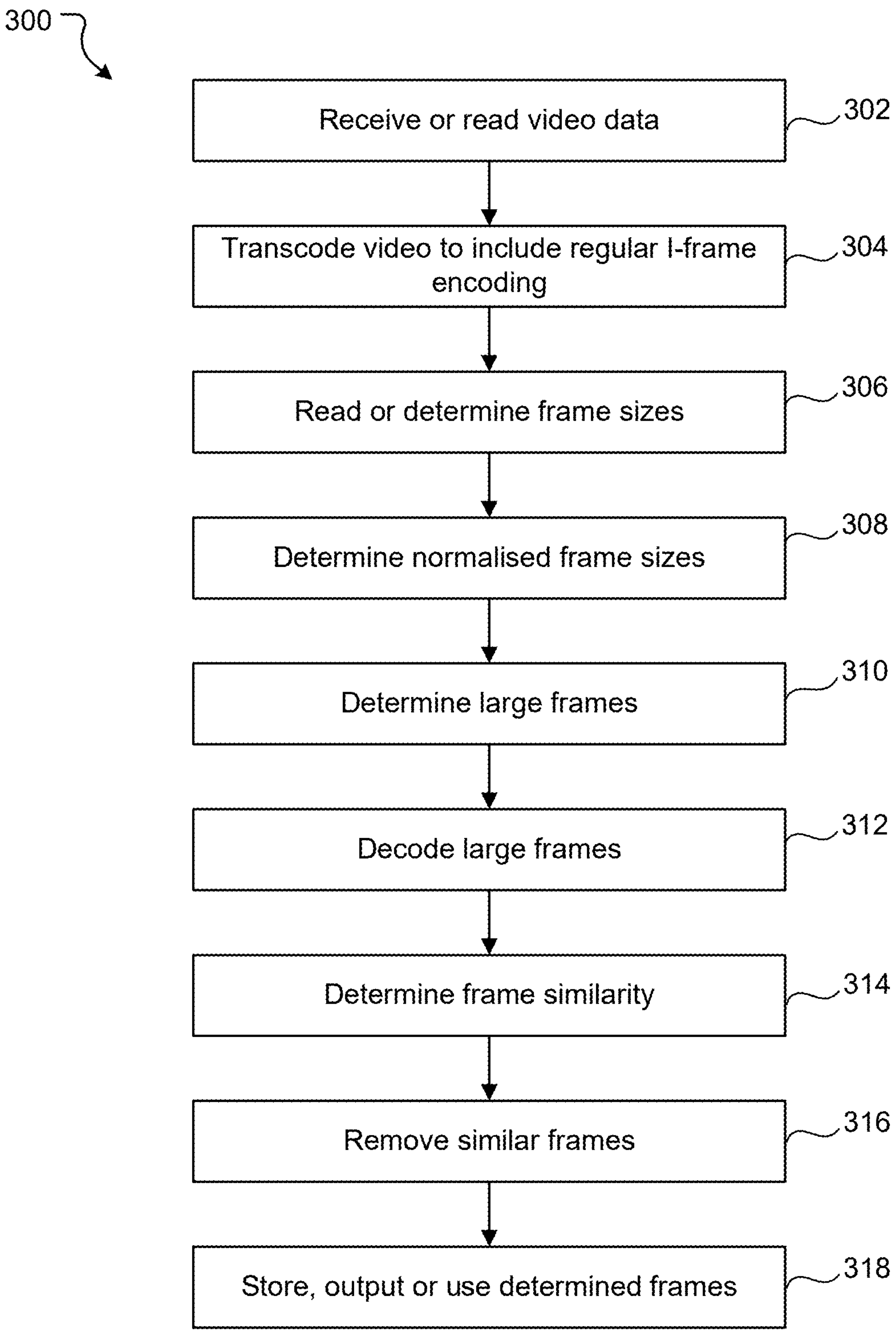
FIG. 3 is a flowchart illustrating an example method for determining or identifying frames of a video.

The server application 114 provides various functions, including some or all of the functionality of the method 300 described herein with reference to FIG. 3. The server application 114 may facilitate other functions, for example functions relating to receiving, creating, storing, retrieving or editing video content items.

In addition to these functions, the server application 114 is also configured to analyse a video content item and determine or identify frames of the video content item and generate and provide an output. To do so, the server application 114 includes a frame processor 116. The frame processor 116 is configured to receive video content items and process the video content items to determine or identify frames from the video content items. As explained herein, the frames are a subset of the frames of the video content item being processed.

The data storage application 120 executes to receive and process requests to persistently store and retrieve data relevant to the operations performed/services provided by the server application 114 or the frame processor 116. Such requests may be received from the server application 114 or the highlight generation system 116, or (in some instances) directly from client applications such as the client application 132. The data storage application 120 may, for example, be a database management application or an alternative application for storing and retrieving data from data storage 122. Data storage 122 may be any appropriate data storage device or set of devices, for example one or more non-transitory computer readable storage devices such as hard disks, solid state drives, tape drives, or alternative computer readable storage devices.

In the server 110, the server application 114 persistently stores data to data storage 122 via the data storage application 120. In alternative implementations, however, the server application 114 may be configured to directly interact with data storage devices such as the data storage 122 to store and retrieve data (in which case a separate data storage application 120 may not be needed).

The data storage 122 maintains data relevant to the operations performed/services provided by the server application 114. In some embodiments, the data storage 122 includes video data 124 of a set of video content items made available by the server 110. The video content items may have been requested to be saved by users (e.g. operating the client system 130) at the video editing server 110. The video data 124 may be processed by the frame processor 116, for example in response to a request received from the client system 130. The data storage may further stores frame data 126 generated by the server application 114, in particular frame data 126 generated by the frame processor 116 processing a video content item defined by the video data 124. The frame data 126 for each video content item includes either the identified or determined frames themselves or includes data defining the identified or determined frames in the video data 124. Although a single data storage 122 is displayed in FIG. 1, it will be appreciated that the data storage 122 may include multiple individual data stores for storing different types of data. For example, one data store may be used for user account data, another for design data, another for design asset data, another for highlights data, and so forth.

As noted, the server application 114 or the frame processor 116 run on or are executed by computer processing hardware 112. Computer processing hardware 112 includes one or more computer processing systems. The precise number and nature of those systems will depend on the architecture of the video editing server 110.

Communication between the applications and computer processing systems of the video editing server 110 may be by any appropriate means, for example direct communication or networked communication over one or more local area networks, wide area networks, and/or public networks (with a secure logical overlay, such as a VPN, if required).

The present disclosure describes various operations that are performed by applications of the server 110. However, operations described as being performed by a particular application or module could be performed by one or more alternative applications, and/or operations described as being performed by multiple separate applications could in some instances be performed by a single application.

The client system 130 hosts a client application 132 which, when executed by the client system 130, configures the client system 130 to provide client-side functionality/interact with the server 110. Via the client application 132 a user can access the various functionality described herein—e.g., the user can create, upload or select video content items for processing, view and/or preview video content items and request generation of frame data 126 for a video content item. The client application 132 may also provide a user with access to additional editing related operations, such as creating, editing, playing, saving, publishing, sharing, and/or other video related operations.

The client application 132 may be a general web browser application which accesses the server application 114 and/or the data storage application 120 via an appropriate uniform resource locator (URL) and communicates with these server applications via general world-wide-web protocols (e.g. HTTP, HTTPS, FTP). Alternatively, the client application 132 may be a native application programmed to communicate with the server application 114 and/or the data storage application 120 using defined application programming interface (API) calls and responses.

The techniques and operations described herein are performed by one or more computer processing systems. By way of example, the client system 130 may be any computer processing system which is configured (or configurable) by hardware or software—e.g. client application 132—to offer client-side functionality. A client system 130 may be a desktop computer, laptop computer, tablet computing device, mobile/smart phone, or other appropriate computer processing system.

Similarly, the applications of the server 110 are also executed by one or more computer processing systems (the computer processing hardware 112). Server computer processing systems will typically be server systems, though again may be any appropriate computer processing systems.

FIG. 2 is a block diagram of a computer processing system 200 configurable to implement embodiments and/or functionality described herein. The system 200 is a general-purpose computer processing system. It will be appreciated that FIG. 2 does not illustrate all functional or physical components of a computer processing system. For example, no power supply or power supply interface has been depicted, however the system 200 either carries a power supply or is configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

The computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable (either in a shared or dedicated manner) by the system 200.

Through a communications bus 204 the processing unit 202 is in data communication with a one or more machine readable storage (memory) devices which store computer readable instructions and/or data which are executed by the processing unit 202 to control operation of the processing the system 200. In this example the system 200 includes a system memory 206 (e.g. a BIOS), volatile memory 208 (e.g. random-access memory such as one or more DRAM modules), and non-transitory memory 210 (e.g. one or more hard disk or solid-state drives).

The computer processing system 200 also includes one or more interfaces, indicated generally by 212, via which the system 200 interfaces with various devices and/or networks. Other devices may be integral with the system 200 or may be separate. Where a device is separate from the system 200, the connection between the device and the system 200 may be via wired or wireless hardware and communication protocols and may be a direct or an indirect (e.g. networked) connection.

Generally speaking, and depending on the system in question, devices to which the system 200 connects include one or more input devices to allow data to be input into/received by the system 200 and one or more output device to allow data to be output by the system 200.

By way of example, where the computer processing system 200 is a personal computing device such as a desktop or laptop device, it may include a display 218 (which may be a touch screen display and as such operate as both an input and output device), a camera device 220, a microphone device 222 (which may be integrated with the camera device), a cursor control device 224 (e.g. a mouse, trackpad, or other cursor control device), a keyboard 226, and a speaker device 228. As another example, where the system 200 is a portable personal computing device such as a smart phone or tablet it may include a touchscreen display 218, a camera device 220, a microphone device 222, and a speaker device 228.

As another example, where the system 200 is a server computing device it may be remotely operable from another computing device via a communication network. Such a server may not itself need/require further peripherals such as a display, keyboard, cursor control device etc. (though may nonetheless be connectable to such devices via appropriate ports).

The computer processing system 200 also includes one or more communications interfaces 216 for communication with a network, such as network 140 of environment 100 (and/or a local network within the video editing server 110). Via the communications interface(s) 216, the system 200 can communicate data to and receive data from networked systems and/or devices.

The computer processing system 200 stores or has access to computer applications (which may also be referred to as computer software or computer programs). Such applications include computer readable instructions and data which, when executed by the processing unit 202, configure the system 200 to receive, process, and output data. Instructions and data can be stored on non-transitory memory 210 accessible to the system 200.

Typically, one application accessible to the system 200 will be an operating system application. In addition, the system 200 will store or have access to applications which, when executed by the processing unit 202, configure the system 200 to perform various computer-implemented processing operations described herein.

FIG. 3 shows an example method for determining a set of frames from a video. The method may be performed by, in or at the networked environment 100, the computer processing system 200 or another processing system. The operations of the method 300 are generally described as being performed by the computer processing system 200. As stated above, the operations could, however, be performed by one or more alternative computer processing systems or networked environments. The operations of the method 300 are described with reference to an encoding format with I-frames, P-frames and B-frames, for example encoding according to a Moving Pictures Experts Group (MPEG) video compression, such as MPEG-4. The video need not necessarily include P-frames and may include only I-frames and B-frames. The video need not necessarily include one B-frames and may include only I-frames and P-frames. The operations could also be performed in relation to other encoding formats with interdependent frames of variable frame size, in particular to encoding formats in which the frame size of interdependent frames is related to the extent of visual change, for example due to the use of difference encoding. The video may be encoded at any suitable frame rate, for example a frame rate between 24 to 60 frames per second (inclusive).

The method 300 may be performed responsive to a user request. The user may operate the computer processing system 200 to provide the user request, for example by selecting a selectable button, menu item or other selectable part of a graphical user interface displayed on the display 218, or by entering a command to execute a set of instructions or an application that causes the computer processing system 200 to implement the method 300. The user may use the keyboard 226, the cursor control device 224 or other peripheral device to provide the user request to the computer processing system 200. Alternatively a request to perform the method 300 may be received via the communication interface(s) 216. The request may come from another computer processing system and that other computer processing may have received a user request, for example in a networked environment such as the networked environment 100.

In step 302 the computer processing system 200 receives or reads video data of video content for processing. The video data may be received via a communication interface or a peripheral device and retained in data storage, for example in volatile memory 208 or non-transitory memory 210 accessible by the processing unit 202. If the video is already present in data storage of the computer processing system 200, it may be read by the processing unit 202.

In some embodiments, the received video data is transcoded in step 304. The transcoding may include forming encoded video with a regular I-frame encoding. The regular I-frame encoding may be, for example, every 2 seconds. Other rates of I-frame encoding may be used, for example between 0.1 to 10 seconds (inclusive) or any value (integer or non-integer) in between.

The regular I-frame encoding may be independent of scene changes, so that a scene change may occur between two I-frames. Alternatively the regular I-frame encoding may be in addition to I-frames based on scene changes. Alternatively the I-frame encoding is according to another approach, for example based on scene change or shot change detection, whether as a result of a previous transcoding, original creation or otherwise. Alternatively or additionally, the transcoding may include adding frame size information to the meta data of a frame, for example by transcoding into a format in which the frame size is directly readable from the header of the frame. In other embodiments step 304 is omitted. For example, step 304 may be omitted if the video data already has regular I-frames or has a header with frame size information, whether as a result of a previous transcoding or otherwise.

In step 306 the computer processing system 200 reads or determines a frame size for frames of the video data.

The frame size is read or determined based on meta data for that frame. For example, the frame size is read or determined based on header data of the frame. Where the video data meta data directly specifies the frame size, then this meta data may be read in step 306. Alternatively, the meta data may indirectly specify the frame size, for example due to including a frame start code or similar the frame size is determined from the distance between frame start codes in the video data. As used herein, reading or determining the frame size includes reading or determining any indicator of the size of a payload of the frame. For example, reading or determining a payload length is a determination of frame size, even though there is not a direct determination of the total frame size including its header or other data.

Generally speaking, video files are divided into a series of packets. The size of a frame may be determined by reading the meta data of the individual packets of a video file. For example, under the MPEG-4 video format, each packet may correspond to one frame. The packet or frame includes various header fields, including a "pts_time" field and a "size" field. For example, a packet may contain the following metadata "pts_time=0.100000, size=4108". In such cases, a corresponding timestamp and size and of each frame is determined by reading the presentation time (pts_time) and size of each packet. The pts_time may be in seconds and the size may be in bytes. Using the pts_time, each frame and corresponding frame size can be determined from the packets.

In step 308, the computer processing system 200 determines a normalised frame size (e.g. number of bytes or bits) for each of the read or determined frame sizes. The determination may normalise for differences in frame size or bit rate, which may be determined from meta data of the received or read video data. In other embodiments step 308 is omitted, for example in implementations in which the frame size and bit rate are not variable or in implementations in which different threshold sizes (see below, step 310) are applied for different frame sizes or bit rates.

In step 310, the computer processing system 200 determines the frames of the received or read video data that are large frames. The large frames may have a frame size above a threshold. The threshold is predetermined to include at least most, up to all, of the I-frames. Alternatively, all I-frames are deemed large frames and the threshold is used to determine what B-frames or P-frames are large frames. The threshold is predetermined to include B-frames or P-frames which correspond to large visual changes in the video defined by the video data. If normalised frame sizes are used, there may be a single threshold across videos that vary according to the parameter or parameters that have been normalized. Different thresholds may be used for parameters that affect the frame sizes and which are not normalized.

In one example step 310 includes determining a frame (the Current Frame) as a large frame if (Current Frame Size−Minimum Frame size)/(Maximum Frame Size−Minimum Frame Size)≥0.2. The Current Frame Size is the size of the Current Frame, the Minimum Frame Size is the size of the smallest frame(s) in the encoded video and the Maximum Frame Size is the size of the largest frame(s) in the encoded video. The threshold of 0.2 was empirically determined for a sample set of encoded videos as a suitable balance between keeping the number of frames selected relatively low and avoiding the loss of too much information. Other thresholds may be selected. The appropriate threshold may depend on anticipated further processing of the selected video frames. Various other measures may be used to determine the large frames, including for example comparing the absolute value of the size to a threshold value, or to normalize based on the number of standard deviations from the mean.

In some embodiments the determined set of frames from the video are the frames determined in step 310. In other words, the method 300 of determining a set of frames may end at step 310 and the method may proceed from step 310 to step 318. In other embodiments the method proceeds to steps 312 to 318. Similarly, if a set of decoded frames is available, then another method of determining a set of frames involves reading the decoded frames and processing the set of decoded frames using steps 314 to 318, without steps 302 to 312.

In step 312 the large frames, being the frames determined to have a size above a threshold in step 310, are decoded by the computer processing system 200. The decoded frames may be stored by the computer processing system 200 in data storage. It will be appreciated that method 300 does not involve decoding the entire video. Accordingly, the processing resources and time to do this is avoided.

In step 314 neighbouring or adjacent decoded large frames are compared to determine their similarity. By neighbouring or adjacent it is meant that the frames do not include any other large frames between them in the timeline of the video content. The frames need not be immediately adjacent frames in the video content itself. In some embodiments the similarity is semantic similarity. In some embodiments a numerical vector or vector embedding is determined that represents the large frames, which numerical vector or vector embedding may also be referred to as a clip embedding or video embedding. A distance between the clip embedding or video embedding of neighbouring or adjacent decoded large frames is then determined. This distance is a determined measure of frame similarity. In other embodiments different methods of determining frame semantic similarity may be used, for example feature-based comparison such as histogram comparison, perceptual hashing or a pre-trained neural network. In still other embodiments a measure of frame similarity may be at the pixel-level, for example computing a mean squared error of the pixel values.

In step 316 the computer processing system 200 removes frames that are similar to their neighbouring or adjacent frames from the set of frames determined in step 310. In some embodiments a similarity threshold is applied in step 316 to determine which frames are similar to each other and which are not. An example similarity threshold is a threshold distance between clip embeddings or video embeddings or perceptual hashing. In other embodiments the similarity is determined without reference to a threshold, for example if a pre-trained neural network is used to determine similar neighbouring or adjacent frames. In some embodiments the larger of the similar frames is retained and the smaller is removed. In other embodiments a different method of determining which frame is removed is used, for example based on time e.g. the later in time is removed optionally with a condition that it is not the earlier in time of another similar pair in which case it is retained, based on distance e.g. the furthest from the preceding I-frame is removed, or applying a change point detection algorithm.

In step 318 the determined or identified frames, or data identifying those frames, is stored, output or used by the computer processing system 200. Step 318 may include generating a file or data structure that includes frame identifiers of the determined or identified frames. The frame identifiers may identify the decoded frames. Alternatively, the frame identifiers may identify the encoded frames, in which case a decoding process will need to be performed for many uses of the determined or identified frames.

The frames or data identifying the frames includes or is associated with time information. The time information may specify the time order of the frames. The time information may specify a timecode of each frame, which timecode may correlate to the time position of the frame in the video of the encoded video. The combination of the set of determined or identified frames and the time information provides a form of video script. Whilst the encoded video may be at many frames per second, the number of frames per second in the video script may be less or substantially less. For example, the video script may have frames per second that is or is on average 10 frames per second or less, when the video from which the video script was formed is 24 frames per second or more or 50 or 60 frames per second or more. It will be appreciated that the 10 frames per second or less (e.g. any other value from about 0.1 frames per second upwards) is just an example. The number of frames in the video script is determined by the parameters of the computer system implementing the method, such as the threshold for the determination of what is a large encoded frame, the threshold for the determination what are similar frames and what are dissimilar frames and any other processing. For example, one or both of these thresholds may be set to achieve a particular number of frames or further processing may remove further frames or add back in removed frames to achieve a target frame rate or achieve a frame rate within a target range in the video script. For example, the frame rate or average frame rate of a video script may be any value (not limited to integer values) between 0.1% and 99% inclusive of the frame rate of the video that is processed according to the methods described herein. It is anticipated that many useful embodiments will between 0.1% or 0.5% or 1% and 5% or 10% or 20% (in any combination). Other embodiments may have a percentage of less than 0.1%, for example if a comparatively lower level of detail is required.

Whilst in some embodiments the large frames determined in step 310 are all frames of an encoded video that are above the size threshold, in other embodiments additional processes may add further large frames or remove some of the large frames that are above the size threshold. For example, where there are no B- or P-frames between two I-frames, an additional process may add at least one B-frame or at least on P-frame, for instance selecting the or a largest frame even though it is below the threshold. In another example, where there are several B- or P-frames between two I-frames the smallest may be removed even though they are above the size threshold. Similarly, whilst in some embodiments one of each pair of similar frames determined in step 316 is removed to form a final set of frames for output, some similar frames may be retained based on one or more additional criteria. In these instances, the respective sets of frames are in part based on the frame size and in part based on the determination of similarity.

In some embodiments the method includes determining in step 310 that at least one B-frame is above the threshold. In some embodiments the method includes determining in step 310 that at least one P-frame is above the threshold. In some embodiments the method includes determining in step 310 at least one B-frame and at least one P-frame are above the threshold. In some embodiments the method includes determining in step 310 that between neighbouring or adjacent I-frames there is at least one B-frame and at least one P-frame above the threshold. In some embodiments the method includes determining in step 310 that at least two B-frames are above the threshold. In some embodiments the method includes determining in step 310 that at least two P-frames are above the threshold. In some embodiments the method includes determining in step 310 at least two B-frames and at least two P-frames are above the threshold. In some embodiments the at least two B-frames or the at least two P-frames may be between neighbouring or adjacent I-frames. Similarly, steps 312 to 318 may be performed in relation to any of these combinations of B-frames and P-frames.

Various example uses of the frames (or data identifying the frames) are to create navigable or informational content related to the video defined by the video data. The computer processing system 200, or another computer processing system that receives or has access to the frames identified by the process 300, may be configured to process the frames to generate navigable or informational content such as highlights or chapters. The frames may be used in other processing, for example to analyse characteristics of the video without having to analyse all frames. In general, the frames may be used when a subset of frames from a video is required or provides an advantage or material useful difference over use of all frames of the video.

The processing of the frames determined or identified by the method 300 may include processing by a trained machine learning model. The machine learning model may be a general machine learning model, which processes the determined or identified frames based on configuration data. Alternatively, the machine learning model may be specifically trained for a processing task of the determined or identified frames, such as for the generation of highlights or chapters or for performing other analysis.

In some embodiments the present disclosure generally relates to a method for identifying or determining frames from a video that may be provided to a machine learning model. The processing of the determined or identified frames may include other processing, for example rule-based processing by a rule-based system or a combination of rule-based processing and processing by a machine learning model. In any case, the determined or identified frames may be provided for processing instead of all of the frames, which may significantly reduce one or more costs (e.g. time, computational resources or financial) associated with the processing.

Unless otherwise stated, as used herein, including in the accompanying claims:

the terms "include" and "comprise" (and variations thereof such as "including" and "comprising", "includes" and "comprises" and the like) are used synonymously and are used inclusively and do not exclude further features, components, integers, steps, or elements:

a recitation of "a", "an" or "the" is intended to mean "one or more" unless specifically indicated to the contrary;

the use of "or" is intended to mean an "inclusive or," and not an "exclusive or" unless specifically indicated to the contrary;

reference to a "first" component, integer, feature or other item does not necessarily require that a second component, integer, feature or other item be provided and use of "first" or "second" does not refer to a temporal or spatial location unless expressly stated; and the term "based on" is intended to mean "based at least in part on".

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer-implemented method including:

determining a first set of frames, wherein the first set of frames includes a plurality of encoded frames of encoded video content determined, as part of the determining of the first set of frames, to be large encoded frames and does not include a plurality of encoded frames of the encoded video content determined, as part of the determining of the first set of frames, not to be large encoded frames;

decoding the first set of frames to generate a first set of decoded frames;

determining, based on a similarity metric between decoded frames, similar frames in the first set of decoded frames, wherein the similar frames are neighbouring or adjacent decoded frames in the first set of decoded frames;

determining a second set of frames based on the determined first set of frames and the determined similar frames, wherein the second set of frames omits at least one frame of the first set of frames based on the determined similar frames; and storing, outputting or using the determined second set of frames or data identifying the determined second set of frames.

2. The computer-implemented method of claim 1, wherein the encoded video content includes interdependent frames formed based on difference encoding.

3. The computer-implemented method of claim 1, wherein the encoded video content includes I-frames and at least one of P-frames and B-frames.

4. The computer-implemented method of claim 1, wherein the encoded video content is encoded according to a form of MPEG video compression.

5. The computer-implemented method of claim 3, wherein determining the first set of frames comprises including all I-frames of the encoded video content in the first set of frames.

6. The computer-implemented method of claim 5, wherein determining frames to be large encoded frames comprises determining whether P-frames or B-frames are large frames.

7. The computer-implemented method of claim 6, wherein the determination of a large encoded frame is made with reference to a normalised size of the encoded frame.

8. The computer-implemented method of claim 1, wherein the similarity metric between decoded frames is a measure of distance between a vector embedding of the decoded frames.

9. The computer-implemented method of claim 8, wherein the vector embedding of the decoded frames is a clip embedding.

10. The computer-implemented method of claim 1, wherein the similarity metric between decoded frames is a measure frame semantic similarity.

11. The computer-implemented method of claim 1, wherein the encoded video content is first encoded video content and wherein the method further includes creating the first encoded video content by transcoding second encoded video content.

12. The computer-implemented method of claim 11, wherein the second encoded video content has irregular I-frame encoding and the transcoding results in the first encoded video content having regular I-frame encoding.

13. The computer-implemented method of claim 11, wherein the second encoded video content does not have directly readable frame size information in meta data and the transcoding results in the first encoded video content having directly readable frame size information.

14. The computer-implemented method of claim 1, wherein the storing, outputting or using the determined second set of frames or data identifying the determined second set of frames comprises providing the determined set of frames to a trained machine learning model.

15. The computer-implemented method of claim 14, wherein the trained machine learning model is configured or trained to produce navigable content for the video content.

16. The computer-implemented method of claim 15, wherein the navigable content is highlights of the video content.

17. The computer-implemented method of claim 15, wherein the navigable content is a set of chapters of the video content.

18. A computer processing system including:

a processing unit; and a non-transitory computer-readable storage medium storing instructions, which when executed by the processing unit, cause the processing unit to perform a method according to claim 1.

19. Non-transitory storage storing instructions executable by processing unit to cause the processing unit to perform a method according to claim 1.

* * * * *